June 7, 1932.  G. MITZLAFF  1,861,750
METHOD OF REGULATION OF SHIP PROPULSION SYSTEMS
Filed Dec. 13, 1929
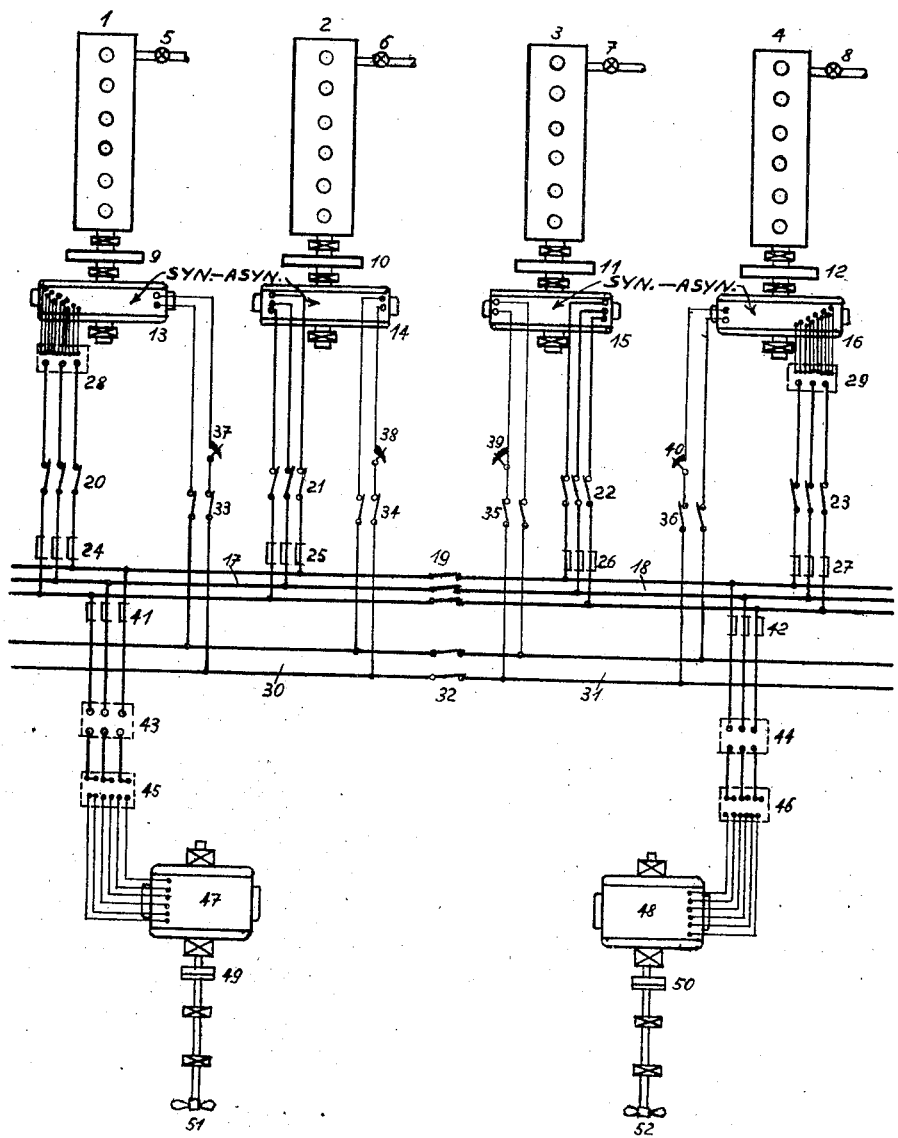
Inventor
Georg Mitzlaff
By Alfred N Dyson
Attorney.

Patented June 7, 1932

1,861,750

UNITED STATES PATENT OFFICE

GEORG MITZLAFF, OF MANNHEIM, GERMANY, ASSIGNOR TO AKTIENGESELLSCHAFT BROWN BOVERI & CIE., OF BADEN, SWITZERLAND, A JOINT STOCK COMPANY OF SWITZERLAND

METHOD OF REGULATION OF SHIP-PROPULSION SYSTEMS

Application filed December 13, 1929, Serial No. 413,915, and in Germany December 10, 1928.

My invention relates to improvements in methods of regulation of ship-propulsion systems. In large modern ships which travel at a high speed it is no longer possible to use a single Diesel engine for driving the propeller shaft, as it has hitherto been impossible for technical reasons to make Diesel engines of such power. Ships of this kind are consequently fitted with several such engines which drive through suitable transmission members on to a single propeller shaft or on to several propeller shafts.

For transmitting the power electric machines have proved to be particularly suitable, continuous current machines in Ward-Leonard connection being frequently used, and sometimes three-phase synchronous generators with three-phase synchronous motors. Continuous current machines have the disadvantage that they are very heavy and that they require careful attention, owing to their delicate constructional parts, such as the commutator and brush apparatus. In addition to this, short-circuits are difficult to deal with and with continuous current the employment of considerable voltages entails greater difficulties than is the case with three-phase systems. On the other hand three-phase synchronous machines which are preferred for these reasons have the disadvantage that they can only be started from the Diesel side, and that they must be synchronized before being connected up to the machines which are already running, which causes difficulties due to the frequency varying with the speed of revolution of the propeller shaft and takes a certain amount of time which makes the ship more difficult to handle.

It has already been proposed to use, instead of the synchronous machines of ordinary construction with definite poles, so-called synchronized asynchronous machines which can be brought up to their full revolutions electrically as motors. These machines, after they have approximately reached the synchronous speed of revolution, are drawn into synchronism by switching in the continuous current excitation so that a synchronizing operation requiring a considerable amount of time is not required.

The present invention relates to the regulation of such a ship's drive consisting of a number of groups, in which synchronized asynchronous machines are used as generators. If a constant regulation of the speed of revolution were required this could only be effected by regulating the fuel supply of the separate Diesel engines, as a regulation of the speed of revolution of the motors by means of a slip resistance could hardly be used for reasons of economy. It is a peculiarity of ships' drives that a speed regulation in relatively large stages is usually quite sufficient.

According to the invention, the regulation of the speed of revolution is effected by the operating Diesel engine or engines being set to the maximum fuel supply per stroke and the speed regulation being effected solely by putting Diesel engine units into and out of operation. The Diesel engine which is set to a constant fuel supply behaves as regards the dependence of the torque on the speed of revolution in the known elastic manner referred to in practice as series-connection characteristic. With a constant resistance to motion through the water the speed is thus increased by adding a Diesel unit with constant fuel supply and decreased by the said unit being put out of operation without any other regulation being required. For reasons of reliability in operation automatic means must be provided which, on the highest admissible speed of revolution being exceeded, stops the constant fuel supply so that the set cannot race due to the generator being unexpectedly relieved of load.

The invention also consists in using the known regulation of the speed of revolution by changing the pole connections for obtaining lower speeds of revolution. According to the invention, the change of pole connections is effected not in the usual manner at the motor, but at the generators of the separate groups, and preferably only at some of the same. The robustness of the driving system described above enables generators having changeable pole connections to be connected directly with generators having a fixed number of poles. In this case it will be of advantage to disconnect electrically the Diesel group with the generator changed over to the greater number of poles on a maximum speed of revolution being exceeded.

In the drawing a constructional example of the invention is illustrated as far as such a representation is diagrammatically possible.

1, 2, 3 and 4 show Diesel engines each with their fuel admission valves 5, 6, 7 and 8. They are coupled with flywheels 9, 10, 11 and 12 and with alternating current generators 13, 14, 15 and 16, respectively. These machines are of the synchronized asynchronous type, two of them, 13 and 16, being provided with pole changing connections on their stator windings. The four generators feed into two main bus-bar systems 17 and 18, the generators 13 and 14 feeding the main bus system 17, and the generators 15 and 16 the bus system 18. The bus-bars can be paralleled by the tie switch 19. The leads from the generators to the bus-bars pass over the main alternator switches 20, 21, 22 and 23 as well as the isolating switches 24, 25, 26 and 27. The leads connecting the generators 13 and 16 pass over the pole-changing switches 28 and 29. The generators are excited from the excitation bus systems 30 and 31 coupled by the tie switch 32. The excitation current passes over the field switches 33, 34, 35 and 36 and the field rheostats 37, 38, 39 and 40 to the field winding of the generators 13, 14, 15 and 16. The propelling motors 47 and 48, which drive the ship's propellers 51 and 52 through the couplings 49 and 50, are each connected to one of the bus-bar systems through the isolating switches 41 and 42, the reversing switches 43, and 44 and the star-delta switches 45 and 46. The right-hand propeller 52 is arranged at the starboard side; the left-hand one 51 at the port side. The drives on each side of the ship can, therefore, be operated independently of each other, by the opening of the tie switches 19 and 32.

I claim as my invention:

1. The method of speed regulation in a ship-propulsion system comprising a motor supplied with operating power by a plurality of power units each including a prime mover and a generator driven thereby, said method comprising setting the operating units with the respective prime movers thereof fed constantly at substantially their maximum rated fuel supply, and putting the units into and out of operation as required to regulate the speed of operation of the motor.

2. The method of speed regulation in a ship-propulsion system comprising a plurality of power units supplying a motor and each including a prime mover and a generator driven thereby, said method comprising setting the operating units with the respective prime movers thereof fed constantly at substantially their maximum rated fuel supply, putting the units into and out of operation as required for regulation of the speed of operation of the motor in the higher speed range, and changing the pole connections of certain of said generators for regulation of the speed of operation of the motor in the lower speed range.

In testimony whereof I have hereunto subscribed my name this 22nd day of November, A. D. 1929.

GEORG MITZLAFF.